United States Patent [19]

Columbus et al.

[11] 4,160,750

[45] Jul. 10, 1979

[54] AQUEOUS ACRYLIC CONTACT CEMENT

[75] Inventors: Peter S. Columbus, Whitestone; John Anderson, Brooklyn, both of N.Y.

[73] Assignee: Borden, Inc., Columbus, Ohio

[21] Appl. No.: 770,517

[22] Filed: Feb. 22, 1977

[51] Int. Cl.$^2$ ................................................ C08L 1/00
[52] U.S. Cl. ........................... 260/17.4 ST; 106/205; 106/208; 106/287.14; 156/328; 156/332; 260/29.6 R; 428/522
[58] Field of Search ................. 156/328, 332, 329; 427/385 R, 387; 428/522; 106/205, 208, 287 SB; 260/17.4 ST, 29.6 R

[56] References Cited

U.S. PATENT DOCUMENTS

| | | | |
|---|---|---|---|
| 2,904,526 | 9/1959 | Uelzmann | 250/29.6 R |
| 2,976,204 | 3/1961 | Young et al. | 260/29.6 R |
| 3,196,122 | 7/1965 | Evans | 260/29.6 R |
| 3,395,072 | 7/1968 | Talet et al. | 260/17.4 ST |
| 3,438,915 | 4/1969 | Girard | 260/17.4 ST |
| 3,463,690 | 8/1969 | Converse et al. | 156/332 |
| 3,547,766 | 12/1970 | Chu | 156/329 |
| 3,734,801 | 5/1973 | Sebel | 106/205 |
| 3,787,452 | 1/1974 | Leumann et al. | 156/329 |

*Primary Examiner*—John T. Goolkasian
*Assistant Examiner*—J. J. Gallagher
*Attorney, Agent, or Firm*—George A. Kap; George P. Maskas; Daniel D. Mast

[57] ABSTRACT

An acrylic contact cement is prepared from ingredients which include in excess of about 98% of a 52% acrylic emulsion; trace quantities of an epoxy silane and glyoxal which synergistically improve water resistance and adhesion without interfering with shelf stability and freeze-thaw property of the cement; a thickener which suspends and stabilizes water-based system; and a perfuming agent.

10 Claims, No Drawings

AQUEOUS ACRYLIC CONTACT CEMENT

This invention relates to a water-based acrylic contact cement which has shelf stability, freeze-thaw stability, good brushing properties and improved bond strength and water resistance. The cement provides strong, long-lasting bonds with a variety of surfaces including most plastics, plywood, wood, particleboard, hardboard, metal, leather, paper and solid foams. This acrylic cement is prepared from the following components which are given in percent based on 100 dry parts of the acrylic polymer:

|  | preferred | broad |
|---|---|---|
| acrylic polymer | 100 | 100 |
| thickener | 0.015–0.12 | 0.005–0.16 |
| glyoxal | 0.0015–0.01 | 0.0008–0.2 |
| epoxy silane | 0.004–0.02 | 0.002–0.5 |

The basis of 100 parts of the acrylic polymer includes the weight of the acrylic ester polymer or copolymers as well as a small amount of an unsaturated organic acid that is copolymerized therewith and a small amount of a nitrogen compound. The acrylic ester polymer or copolymers comprise in excess of 90%, and preferably in excess of 95%, of the acrylic polymer.

For ease of manufacture when using standard materials, the table below gives preferred amounts in percent of each essential ingredient based on the weight of the finished cement:

| 52% acrylic emulsion | about 98–99.75% |
|---|---|
| 3% thickener solution | 0.25–2% |
| 40% glyoxal solution | 0.002–0.01% |
| epoxy silane | 0.002–0.01% |

If there is any conflict between the preferred ranges on dry and wet bases, the wet basis presented immediately above will govern since the dry basis ranges were derived therefrom.

Brookfield viscosity of the finished contact cement is in the range of 250 to 2500 cps but preferably it is between about 500 and 1500 cps. Measurement of the viscosity was made with #3 spindle at 25° C. and at 60 rpm for up to 1500 cps and at 30 rpm above 1500 cps. It has been determined that when amount of glyoxal exceeds 0.01% and amount of the silane exceeds 0.02%, freeze/thaw stability is adversely affected whereas respective amounts of each of these components in excess of 0.05% and 0.10% are detrimental to shelf life of the product. For reasons which should be apparent, amounts of glyoxal and silane can be varied beyond the preferred ranges although shelf life and freeze/thaw stability may be impaired if the noted limits are exceeded.

The acrylic emulsion is based on polymeric acrylates which are prepared using resiliency imparting or soft monomers which are represented by the following structural formula:

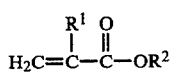

where $R^1$ is H or an alkyl group of 1 to 4 carbon atoms and $R^2$ is a straight chain or branched chain radical of a primary or secondary alkanol, alkoxyalkanol or alkyl-thioalkanol containing from 1 to about 14 carbon atoms. Examples of $R^2$ include methyl, ethyl, propyl, n-butyl, 2-ethylhexyl, hexyl, heptyl, octyl, 2-methylbutyl, 1-methylbutyl, butoxybutyl, 2-methylpentyl, methoxymethyl, ethoxyethyl, n-hexylisobutyl, ethylthioethyl, methylthio-ethyl, methylthiopropyl, 6-methylnonyl, decyl, dodecyl, etc. To further define preferred soft monomers, when $R^1$ is H or a methyl alkyl radical, $R^2$ should contain 2 to 14 carbon atoms; and when $R^1$ is alkyl of 2 to 4 carbon atoms, alkyl radical $R^2$ should contain from 6 to 14 carbon atoms.

The designation $T_g$ stands for glass transition temperature of a polymer and is a conventional criterion of polymer hardness. Where flexibility is required, $T_g$ of the acrylate polymer in the emulsion should be below 15° C., preferably below 0° C., and more preferably below −10° C. For applications where flexability is not necessary, i.e., where rigid surfaces are joined, $T_g$ of the polymer can be between 10° and 25° C. Examples of $T_g$ for certain homopolymers are given below:

| Homopolymer of: | $T_g$ °C. |
|---|---|
| ethyl acrylate | −23 |
| n-octyl acrylate | −80 |
| n-decyl methacrylate | −60 |
| 2-ethylhexyl acrylate | −70 |
| n-butyl acrylate | −56 |
| octyl methacrylate | −20 |
| n-tetradecyl methacrylate | −9 |
| methyl acrylate | 9 |
| n-tetradecyl acrylate | 20 |
| t-butyl acrylate | 43 |
| methyl methacrylate | 105 |
| acrylic acid | 106 |

These or other monomers can be blended to give desired $T_g$ of the copolymer.

The acrylic polymer used in preparing the contact cement is in the form of an acrylic emulsion. Suitable for our purpose is an acrylic emulsion which is white in color wherein about 10% of the particles are 0.2 micron in diameter, with the average size being in the range of 0.5 to 0.8 micron, with a few at 1 micron. Dry films thereof should have rubbery characteristics. Acrylic emulsion which has been found to perform exceedingly well is one which is composed mainly of polyethyl acrylate. When applied to the formula given above, ethyl acrylate is represented by $R^1$ which is H and $R^2$ which is ethyl. The preferred emulsion is sold by Rohm and Haas as Rhoplex ®CA-12 acrylic emulsion designed for formulating latex contact cements, and appears to be prior art. It has excellent adhesion to Formica, particle board and plywood. Typical properties of Rhoplex CA-12 are as follows:

| appearance | milky white liquid |
|---|---|
| solids | 50–54% |
| pH | 5.0–5.5 |
| viscosity (#2 spindle/60 rpm) | 200–500 cps |
| settling on aging | slight |
| freeze/thaw stable | yes |
| storage | 8 months at RT |

On the basis of analysis, Rhoplex CA-12 acrylic emulsion appears to be mainly ethyl acrylate copolymerized with a small amount of acrylic acid in amount varying from 1 to 5%, preferably 2 to 3% of the acrylic polymer and a small amount of hexamethoxymethylmelamine (HMMM) added after polymerization. In addition to acrylic acid, other unsaturated mono or polycarboxylic acids can be used in amount of about 1 to 5%, based on 100 dry parts of the acrylic polymer. Examples of such other acids include sorbic, acryloxacetic, cinnamic, maleic, fumaric, methacrylic, crotonic, itaconic, etc. The alpha-beta unsaturated monocarboxylic acids are preferred, especially acrylic and methacrylic acids. HMMM is used in a small amount of about 0.2 to 5% of the acrylic polymer. Other organic nitrogen compounds, known for their cross-linking facility, can replace HMMM in a lesser preferred embodiment of our invention. Such other nitrogen compounds include amines and salts thereof such as $C_1$ to $C_4$ alkyl amino $C_1$ to $C_4$ alkyl acrylates and methacrylates; ureido monomers; heterocyclic compounds containing nitrogen and halogen and hydroxyalkyl or aminoalkyl substituted derivatives thereof such as $C_1$ to $C_4$ alkoxy $C_1$ to $C_4$ alkyl melamines; pyridines, etc. Alkoxyalkyl melamines containing from 1 to 4 carbon atoms in the alkyl group, are preferred. Some specific examples of such substitutes include beta-aminoethyl vinyl ether, aminopentyl vinyl ether, amyl t-butyl aminoethyl methacrylate, t-dimethylaminoethyl methacrylate, beta-ureidoethyl acrylate, beta-ureidoethyl vinyl ether, N-vinyloxyethyl-N, N'-ethyleneurea, beta-hydroxyethyl methacrylate, N-methylol acrylamide, N-hydroxyethylacrylamide, dimethyl aminoethanol, amyl t-butyl aminoethanol, etc. These nitrogen-containing compounds are added in small amounts for the purpose of aiding cross-linking.

A soft monomer or monomers can be combined with a hard monomer or monomers in certain proportion to yield an emulsion with properties similar to Rhoplex CA-12 emulsion for use in formulating the acrylic latex contact cement described herein. The hard monomers, which are used to prepare the acrylate emulsion, may be represented by the formula

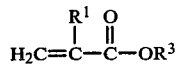

where $R^1$ is as defined in connection with the soft monomer, i.e., is H or an alkyl group of 1 to 4 carbon atoms, whereas $R^3$ is preferably alkyl selected from methyl and alkyl groups containing from about 13 to about 20 carbon atoms when $R^1$ is H; and $R^3$ is preferably alkyl containing 1 to 5 or from 15 to 20 carbon atoms when $R^1$ is methyl. Examples of hard monomers include methyl acrylate, acrylamide, vinyl acetate, tetradecyl acrylate, pentadecyl acrylate, methyl methacrylate, ethyl methacrylate, t-butyl acrylate, butyl methacrylate, styrene, pentadecyl methacrylate, vinyl toluene, methacrylamide, and N-methylolacrylamide.

The acrylic emulsion imparts the adhesive quality to the contact cement and functions to self-crosslink on curing. Being a soft monomer, ethyl acrylate in the preferred acrylic emulsion renders the cured contact cement flexible which is a prerequisite to certain applications. This property can be varied, as described, to meet requirements of a given application.

The preferred thickener is xanthan gum which is sold in a dilute, preferably 3%, aqueous solution as Kelzan ® by Kelco Company. Xanthan gum is a natural high molecular linear polysaccharide. It functions as a hydrophilic colloid to thicken, suspend and stabilize water-based systems. It is stable at acid and alkaline pH, does not interfere with the function of glyoxal and silane, imparts excellent brushing property to the contact cement and is compatible with the other components in the contact cement.

We have discovered that when used in place of xanthan gum, hydroxyethyl cellulose and methyl cellulose separate out whereas sodium acrylate and ammonium polyelectrolytes interfere with the function of the epoxy silane by detracting from the freeze/thaw property of the contact cement. Polyvinyl alcohol was also tried but it reduces water resistance and has to be used in large amounts which, in turn, reduces dry open time. Carbopol ®941, a carboxyvinyl polymer of extremely high molecular weight which is water-soluble, is a suitable thickener although not as effective as xanthan gum.

Xanthan gum is very active and a very small amount provides proper thickening and stability function. During experimentation, it was discovered that amount of 3% aqueous solution of xanthan gum in the contact cement should not exceed about 10%, based on the weight of the contact cement, since otherwise, poor brushability is obtained as well as poor water resistance and increased drying time with reduced dry open time. Dry open time is the time in which the dry adhesive films must be combined for satisfactory results. Other suitable thickening candidates can be selected on the basis of their performance in the contact cement described herein.

In addition to glyoxal, which is generally used as a 40% aqueous solution, formaldehyde and paraformaldehyde can be used in the contact cement formulation although the latter two are toxic, especially paraformaldehyde. Even in the case of formaldehyde, about twice as much must be used to achieve the same function as with glyoxal. The use of glyoxal, or its substitutes, contributes to water-resistance.

Epoxy silanes are adhesion promoting additives and are also characterized as chemical coupling agents which improve the bond between resin and various fillers or substrates. Specific examples of epoxy silanes which are suitable for our purpose for improving bond strength and adhesion are beta-(3,4-epoxycylohexyl) ethyltrimethoxy silane and gamma-glycidoxypropyl-trimethoxysilane. Other epoxy silanes of similar structure should likewise be suitable as in the case where the alkyl or alkylene groups as well as the alkoxy groups are varied from 1 to about 6 carbon atoms.

Any suitable conventional perfuming agent can be used which masks primarily the aldehyde and acrylate odors. Such an agent must be compatible with the other components of the contact cement. An example of such a perfuming agent is Tanafresh HFO material made by Sybron Corporation, which is miscible with water. This material is food grade and is described as a blend of ingredients designed to reduce formaldehyde or amine odors. This perfuming agent is of a pale straw color, nonionic, of essentially neutral pH, has pleasant odor and specific gravity of 0.98. It forms stable, clear solutions compatible with resins, catalysts, softeners, etc., which are normally employed in resin mixes. More specifically, it is a water-soluble mixture of essential oils and emulsifiers. Amount of Tanafresh perfuming agent per 100 dry parts of the acrylic polymer may vary from 0.02 to 0.5%, preferably 0.1 to 0.2%.

In addition to the perfuming agent, other conventional materials can be added to the contact cement which do not alter its character. Such other additives include fillers, pigments, defoamers, etc. These materials may be used in amounts which are normally recommended for such or similar applications.

It should be noted that glyoxal, or its replacement, and silane are used in almost trace quantities. It has been determined that glyoxal and silane function synergistically in the contact cement formulation. The data presented in Example II verifies the synergistic effect that is provided by glyoxal and silane when used in combination.

It is surprising that a combination of glyoxal and silane, in a contact cement formulation, provide very substantial improvements when used in almost trace amounts. It is also surprising that glyoxal and silane, when used in a contact cement formulation, provide water resistance and improved adhesion without affecting freeze/thaw stability and shelf life at levels far below the levels at which they would be expected to affect these properties. The combination of ingredients in the contact cement described herein renders it freeze/thaw stable to −40° F. which is surprising in view of the fact that Rhoplex CA-12 emulsion is freeze/thaw stable only to 0° F. and the fact that the ingredients are used in such small amounts.

When bonding surfaces with the contact cement described herein, the surfaces must be clean, dry, free from oil, wax, paint, varnish or other finish. The cement is then spread evenly on both surfaces by applying it in one direction only and the coat should be smooth. The cement is dry when its appearance has changed from milky white to clear, which takes from about 15 to 40 minutes depending upon the temperature, humidity and porosity of the surface. As soon as the cement on the surfaces has turned clear, the two surfaces should be joined by perfectly aligning them before actually bringing them together. An easy way to provide the perfect alignment is to keep a sheet of strong heavy paper between the two surfaces until the alignment is perfect. The sheet is then removed and pressure is applied to the entire surface by tapping with a hard rubber mallet or using a block of soft wood with a hammer. If a paper sheet is used for alignment, extra care must be exercised to make certain that both surfaces are completely dry and tack-free before inserting the paper. This procedure is usually necessary only when large surface areas are involved. Tools used and the hands can be washed with water to remove the contact cement before it has dried.

The following examples are being presented to illustrate preparation of the contact cement and the synergistic performance of glyoxal and silane.

EXAMPLE I

A thickener solution was prepared from the following ingredients which are given in percent based on the weight of the thickener solution:

| water | 96.9% |
|---|---|
| Kelzan xanthan gum | 3.0% |
| Givgard DXN preservative | 0.1% |
| thickener solution | 100.0% |

The preservative given above can be obtained from Givaudan Corporation and is a dimethoxane, i.e., 6-acetoxy-2,4-dimethyl, m-dioxane which is shown to be present in amount of 92% with 8% of inert ingredients. Other suitable preservatives can also be used. The preservative function discussed herein denotes can stability.

The thickener solution is prepared by adding water to a clean fiberglass Schold bin. A vortex is formed with fast agitation, xanthan gum is added very slowly by sprinkling it in which is followed by addition of the preservative. After addition of the preservative is completed, mixing of the contents of the bin is continued for 10 minutes under fast agitation and then under slow to medium agitation for about 20 minutes or until the contents of the bin become smooth and homogeneous. To reduce foam development, agitation is kept below the surface of the mixture. Viscosity is checked and adjusted with water, if necessary. The finished thickener solution should have the following specifications:

| solids | 3.0 ± 0.15% |
|---|---|
| pH | 5.8 ± 0.5 |
| Br.viscosity LVF #4 spindle at 12 RPM & 25 C | 16,500–18,000 cps |

The acrylic contact cement is prepared from the following ingredients which are given in percent based on the weight of the contact cement:

|  | wet basis |
|---|---|
| Rhoplex CA-12 emulsion, 52% solids | 98.940% |
| 3% thickener solution | 1.000% |
| 40% solution of glyoxal | 0.005% |
| gamma-glycidoxypropyltrimethoxy silane | 0.005% |
| Tanafresh HFO perfuming agent | 0.050% |
|  | 100.000% |

Preparation procedure includes the addition of 20.000% of the emulsion to a clean, dry tank followed by addition of the thickener solution with medium agitation which is continued for about 10 minutes until the mixture becomes smooth and homogeneous. Remainder of the emulsion, i.e., 78.940% is added with slow agitation and mixing is continued for 5 minutes. Glyoxal, silane and the perfuming agent are then added slowly with medium agitation followed by mixing at slow agitation for about 10–15 minutes. Viscosity is checked and if high, adjusted with water. If viscosity is low, 26° be. ammonium hydroxide is added very slowly with agitation in portions no larger than 0.05% of total formulation, checking pH and mixing at least 10 minutes after each addition. The pH of 6.1 should not be surpassed. The acrylic contact cement is drawn off through a 70 mesh SS filter and stored. The following are specifications for the contact cement:

| solids | 52.5 ± 1.5% |
|---|---|
| pH | 5.8 ± 0.30 |
| Br. viscosity LVF #3 spindle at 60 RPM & 25° C. | 600–800 cps |

The acrylic contact cement, prepared as described in the above experiment, provides lap shear strength for a plywood to plywood bond of 250–300 psi, can withstand aging for at least 1 year at 75° F. and 50% RH and at least 5 freeze/thaw cycles between −20° F. for 16 hours and 75 for 8 hours. The plywood to plywood laminate bonded with this cement also passes the 6-hour soak test with water maintained at 70° F. after curing. In fact, plywood laminate bonded with this contact cement can withstand aging for 1 month at 80° F. and 90%

RH followed by the 6-hour soak test, which is an extremely severe test.

EXAMPLE II

Additional samples of the contact cement were prepared as described in Example I with the exception that in one sample, the silane was omitted and amount of 40% glyoxal was 0.01% and in another sample, glyoxal was omitted and amount of the silane used was 0.01%. In both instances, amount of omitted material was made up by the use of additional thickener solution. These samples of contact cement were used to bond plywood to plywood and the resulting laminates were subjected to the 6-hour soak test in 75° F. water. The laminates did not pass the soak test, i.e., they delaminated, and adhesion to siliceous materials was not as good for the sample containing only glyoxal.

Two additional samples of the contact cement were prepared as described in the preceding paragraph with the exception that amount of the silane and 40% glyoxal used individually was 0.02%. When the plywood to plywood laminates were prepared using these contact cements, the laminates failed to pass the 6-hour soak. Furthermore, freeze/thaw stability and shelf life of each cement was adversely affected. With respect to freeze/thaw, it would not pass 1 cycle, turning lumpy, like cottage cheese.

One more sample of the contact cement was prepared, as in Example I, except the amounts of 40% glyoxal and the silane was 0.01% of each. When tested, as described above, the plywood laminate passed the 6-hour soak test, and the cement showed freeze/thaw stability and shelf life of about 1 year. Even when amounts of glyoxal and the silane were each reduced to 0.005%, this contact cement passed the 6-hour soak test and had good freeze/thaw stability and shelf life.

We claim:

1. Contact cement for adhering like and unlike surfaces which is prepared from the ingredients comprising acrylic ester polymer selected from soft monomers having the following formula:

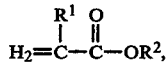

hard monomers having the following formula

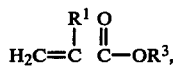

and mixtures thereof, where $R^1$ is H or an alkyl group of 1 to 4 carbon atoms, $R^2$ is alkyl group containing from 1 to 14 carbon atoms and $R^3$ is an alkyl group containing 1 to 20 carbon atoms; about 0.002 to 0.5% of epoxy silane; about 0.0008 to 0.2% of a material selected from the group consisting essentially of glyoxal, formaldehyde paraformaldehyde and mixtures thereof; and sufficient amount of a thickener to give the desired consistency; amounts herein being based on 100 dry parts of the acrylic polymer.

2. Contact cement of claim 1 wherein the ingredients also include about 0.2 to 5% of a nitrogen compound or a mixture thereof to aid in cross-linking selected from amines and salts thereof, ureido monomers, heterocylic compounds and hydroxyalkyl or aminoalkyl derivatives thereof; and about 1 to 5% of an unsaturated carboxylic acid to aid in cross-linking; and wherein $R^1$ is selected from H or a methyl group; and $R^2$ and $R^3$ are selected from alkyl groups containing from about 1 to 8 carbon atoms; the cement being an aqueous system having viscosity of about 250 to 2500 cps; amounts herein are based on 100 dry parts of the acrylic ester polymer, the nitrogen compound and the acid.

3. Contact cement of claim 2 wherein the ingredients also include about 0.015 to 0.12% of a thickener; and a sufficient amount of a perfuming agent to mask unpleasant odors; amount of the material is about 0.0015 to 0.01%; amount of the silane is about 0.004 to 0.02%; and the nitrogen compound is selected from $C_{1-4}$ alkylamino $C_{1-4}$ alkyl acrylates and methacrylates.

4. Contact cement of claim 1, wherein the acrylic ester polymer has a $T_g$ of below about 0° C. and selection of values for the soft and hard monomers is made on the following criterion: when $R^1$ is H or methyl of the soft monomer, $R^2$ contains 1 to about 14 carbon atoms whereas when $R^1$ is alkyl radical of 2 to 4 carbon atoms, then $R^2$ contains 6 to 14 carbon atoms; and for $R^3$ of the hard monomer, when $R^1$ is H, $R^3$ is alkyl containing 1 or from 13 to 20 carbon atoms whereas when $R^1$ is $CH_3$, $R^3$ contains from 1 to 5 carbon atoms or from 15 to 20 carbon atoms; the ingredients further include about 0.2 to 5% of a nitrogen compound or a mixture thereof selected from amines and salts thereof, ureido monomers, and heterocyclic compounds and hydroxyalkyl or aminoalkyl derivatives thereof; and about 1 to 5% of an alpha-beta unsaturated monocarboxylic acid or a mixture thereof; amounts herein are based on 100 dry parts of the acrylic ester polymer, the nitrogen compound and the acid.

5. Contact cement of claim 3 wherein amount of the acid is about 2 to 3% and the acid is selected from acrylic, methacrylic, and mixtures thereof.

6. Contact cement of claim 4 wherein the material is glyoxal, the thickener is xanthan gum, the acrylic polymer is supplied by Rhoplex CA-12 acrylic emulsion and the cement has the following physical properties:

| solids | 52.5 ± 1.5% |
|---|---|
| pH | 5.8 ± 0.30 |
| Br. viscosity LVF #3 spindle at 60 RPM & 25° C. | 600–800 cps. |

7. Contact cement of claim 2 wherein the material is glyoxal, the thickener is xanthan gum, the acrylic polymer is supplied by Rhoplex CA-12 acrylic emulsion and the cement has the following physical properties:

| solids | 52.5 ± 1.5% |
|---|---|
| pH | 5.8 ± 0.30 |
| Br. viscosity LVF #3 spindle at 60 RPM & 25° C. | 600–800 cps. |

8. Contact cement prepared from 98 to 99.75% of Rhoplex CA-12 acrylic emulsion which contains about 52% solids, 0.25 to 2% of a 3% aqueous solution of a thickener, 0.002 to 0.01% of a 40% aqueous solution of glyoxal and 0.002 to 0.01% of an epoxy silane, where the silane and glyoxal synergistically improve water resistance and adhesion of the cement without interfering with shelf stability and freeze/thaw property thereof.

9. Contact cement of claim 8 including a sufficient amount of a perfuming agent to mask unpleasant odors.

10. Contact cement of claim 9 wherein the thickener is xanthan gum; the perfuming agent is Tanafresh HFO; the silane is selected from gamma-glycidoxypropyl-trimethoxysilane, beta-(3,4-epoxycyclohexyl)-ethyl-trimethoxysilane and mixtures thereof; and the cement has the following physical properties:

| | |
|---|---|
| solids | 52.5 ± 1.5% |
| pH | 5.8 ± 0.30 |
| Br. viscosity LVF #3 spindle at 60 RPM & 25° C. | 600–800 cps. |

* * * * *

UNITED STATES PATENT OFFICE
CERTIFICATE OF CORRECTION

Patent No. 4,160,750          Dated July 10, 1979

Inventor(s) Peter Spiros Columbus and John Anderson

It is certified that error appears in the above-identified patent and that said Letters Patent are hereby corrected as shown below:

Col. 3, lines 62 and 63, delete "in a dilute, preferably 3%, aqueous solution as Kelzan® by Kelco Company" and insert thereat --as Kelzan® by Kelco Company and is preferably used as a 3% aqueous solution--;

Col. 5, line 20, change "40°F" to --20°F--;

Col. 6, line 64, following "75" insert thereat --°F--.

Signed and Sealed this

Sixth Day of November 1979

[SEAL]

*Attest:*

RUTH C. MASON
*Attesting Officer*

LUTRELLE F. PARKER
*Acting Commissioner of Patents and Trademarks*